United States Patent [19]

Hirao et al.

[11] Patent Number: 4,659,245
[45] Date of Patent: Apr. 21, 1987

[54] GAS TURBINE

[75] Inventors: Sumio Hirao, Yokohama; Kunio Maki, Yokosuka, both of Japan

[73] Assignee: Nissan Motor Co., Ltd., Yokohama, Japan

[21] Appl. No.: 868,561

[22] Filed: May 30, 1986

[30] Foreign Application Priority Data

May 31, 1985 [JP] Japan .............................. 60-82920[U]

[51] Int. Cl.⁴ .............................. F16C 9/00; F16D 1/00
[52] U.S. Cl. .................................... 403/30; 403/272; 416/244 A; 416/241 B
[58] Field of Search .................... 403/272, 30, 28, 268; 416/244 A, 241 B

[56] References Cited

U.S. PATENT DOCUMENTS 3,801,226 4/1974 Bevan et al. ..................... 416/241 B
4,424,003 1/1984 Brobeck ........................... 416/241 B

FOREIGN PATENT DOCUMENTS 54-42520 4/1979 Japan .
103902 6/1984 Japan .............................. 416/241 B Primary Examiner—Andrew V. Kundrat
Attorney, Agent, or Firm—Schwartz, Jeffery, Schwaab, Mack, Blumenthal & Evans

[57] ABSTRACT

A gas turbine including a joint structure is disclosed. According to the joint structure, a ceramic shaft is received in a bore formed in an end portion of a metallic shaft. Brazing filler metal made of Ag-Cu alloy is distributed between the closely fitted surfaces of the ceramic shaft and bore wall, and it extends axially toward the open end of the bore up to a predetermined plane where a ring seal groove formed on the end portion of the metallic shaft lies. The open end of the bore is closed to prevent entrance of exhaust gas into the bore.

4 Claims, 9 Drawing Figures

GAS TURBINE

BACKGROUND OF THE INVENTION

The present invention relates to a gas turbine including a ceramic turbine and a metallic impeller, and more particularly to a joint structure of a ceramic turbine to a metallic impeller.

A joint structure as shown in FIG. 7 is known from Laying-open Japanese Patent Application No. 54-42520. FIG. 7 shows a ceramic turbine 101 with an integral shaft 102 received in a cylindrical bore of an enlarged diameter portion 106 of a metallic impeller shaft 103. Ring seal groove 104 and oil groove 105 are formed on the outer surface of the enlarged diameter portion 106. Brazing filler metal 107 is distributed between the closely fitted surfaces of the ceramic shaft 102 and the enlarged diameter portion 106. FIG. 7 also shows bearings 108 and 109 and a threaded portion 103a with which an impeller is fixedly carried by the impeller shaft 103.

A joint structure shown in FIG. 8 is known. FIG. 8 shows a ceramic turbine 111 including an integral ceramic shaft 112 formed with a ring seal groove 114 and an oil groove 115, and a metallic impeller shaft 113 having a flanged end 113a. A brazing filler metal 117 is disposed between the closely fitted surfaces of an axial end 112a of the ceramic shaft 112 and flanged end 113a. FIG. 8 also shows bearings 118 and 119, and a threaded portion 115a formed on the metallic impeller shaft 113.

According to the known joint structure shown in FIG. 7, the brazing filler metal 107 distributed between the closely fitted surfaces of the metal and ceramic extends axially toward the open end of the cylindrical bore beyond a predetermined plane where the ring seal groove 104 lies as shown in FIG. 9. Thus, the brazing filler metal 107 has a portion 107a which is always exposed to high temperature exhaust gas so that it is softened and/or melted, and oxidized, resulting in considerable drop in joint between the closey fitted surfaces of the ceramic shaft 102 and enlarged diameter portion 106.

According to the other known joint structure shown in FIG. 8, since the ceramic turbine 111 and the metallic impeller shaft 113 are joined by welding between the axial end 112a of the ceramic shaft 112 and the flanged axial end 113a, there is the limit to reliability in strength of the joint. Besides, since the ceramic shaft 112 is formed with the ring seal groove 114 and oil groove 115, there would occur leakage of oil if the ceramic shaft portion 112 should damage.

Accordingly, an object of the present invention is to provide a joint structure wherein the brazing filler metal distributed between the closely fitted surfaces of the ceramic shaft and the metallic shaft is not exposed to high temperature exhaust gas and the leakage of oil would not occur even if the ceramic shaft portion should be damaged.

SUMMARY OF THE INVENTION

The present invention provides an improved joint structure wherein a ceramic turbine shaft is received in a cylindrical bore formed in a cylindrical end portion of a metallic shaft. The cylindrical end portion has formed on its outer surface with a ring seal groove and an oil groove so that the oil leakage would not be caused by the damage of the ceramic shaft. A brazing filler metal is distributed between the closely fitted surfaces of the ceramic shaft and the cylindrical bore even though it does not extend toward the open end of the cylindrical bore beyond a predetermined plane where the ring seal groove lies. The open end of the cylindrical bore is closed to prevent entrance of high temperature exhaust gas into the cylindrical bore. Preferably, a heat-resistive adhesive/bond seals the open end of the cylindrical bore to prevent entrance of exhaust gas.

DESCRIPTION OF THE PREFERRED EMBODIMENTS

Referring to FIGS. 1 to 5, the first embodiment is described.

Figure 1:
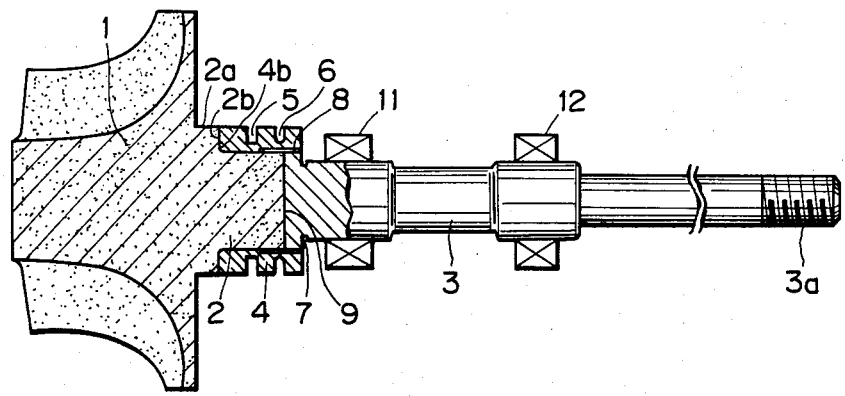
FIG. 1 is a longitudinal schematic sectional view taken along I—I of FIG. 2 of a first embodiment of a joint structure according to the present invention.
Figure 2:
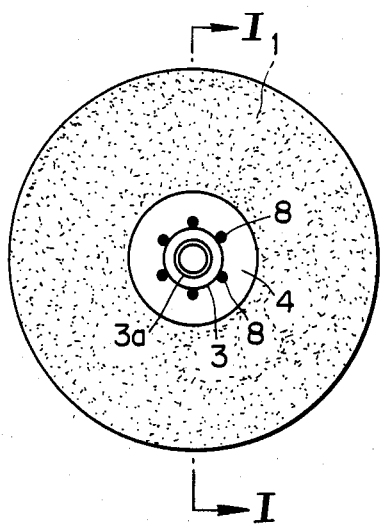
FIG. 2 is an end elavational view of the joint structure as viewed from the righthand of FIG. 1.
Figure 3:
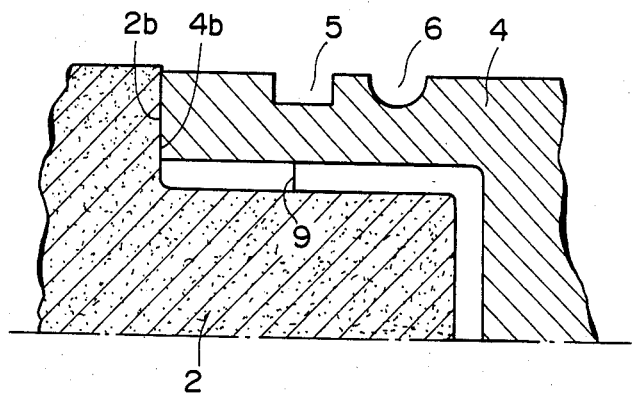
FIG. 3 is a diagrammatic enlarged fragmental view of the joint showing the closely fitted surfaces between which the brazing filler metal is distributed.

FIG. 1 shows a portion of a gas turbine including a ceramic turbine 1 with an integral ceramic shaft 2 connected to turbine 1 via an enlarged diameter portion 2a. A shoulder 2b is defined between the enlarged diameter portion 2a and ceramic shaft 2 and closely engaged with an axial end surface 4b of a cylindrical bore defining portion 4 of a metallic impeller shaft 3 which is formed with a threaded end 3a via which an impeller (not shown) is to be mounted. In this embodiment, the cylindrical bore defining portion 4 is formed integral with the impeller shaft 3 and has an cylindrical outer surface formed with a ring seal groove 5 and an oil groove 6. Near the opposite axial end of the cylindrical portion 4, a circumferential groove 7 is formed. As best seen in FIG. 2, a plurality, six in this embodiment, of axial grooves 8 are formed in the bore defining inner wall of the cylindrical portion 4 and arranged in angularly equi-distant manner. These axial grooves 8 are provided for discharging brazing filler metal. Referring also to FIG. 3, the ceramic shaft 2 is received in the bore of the cylindrical portion 4 with the shoulder 2b closely engaged with the axial end surface 4b to close the open end of the cylindrical bore. The brazing filler metal 9 is distributed between the closely fitted surfaces of the ceramic shaft 2 and cylindrical bore of the portion 4, and it extends axially toward the open end of the cylindrical bore or the shoulder 2b upto a predetermined plane where distribution of exhaust gas is blocked by a ring seal (not shown) disposed in the ring seal groove 5. In this embodiment, the predetermined plane is a plane where the ring seal groove lies. FIG. 1 also shows bearings 11 and 12 for the impeller shaft 3.

To prevent entrance of high temperature exhaust gas into the cylindrical bore so as to prevent its contact with the brazing filler metal 9 the open end of the cylindrical bore is closed by the closely fitted surfaces of the shoulder 2b and axial end 4b. It is preferred to seal between these closely fitted surfaces by inorganic adhesive/bond if these surfaces tend to be separated due to difference in thermal expansion coefficient between the metallic impeller shaft 3 and ceramic shaft 2.

Figure 4:
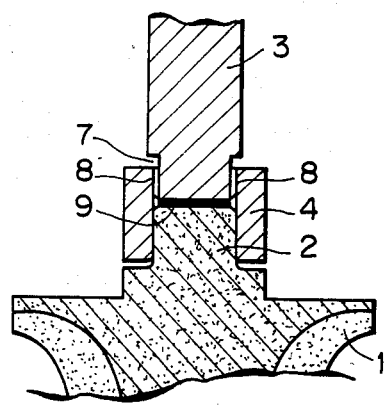
FIGS. 4 and 5 are diagrammatic views used to explain the metal-ceramic brazing process.
Figure 5:
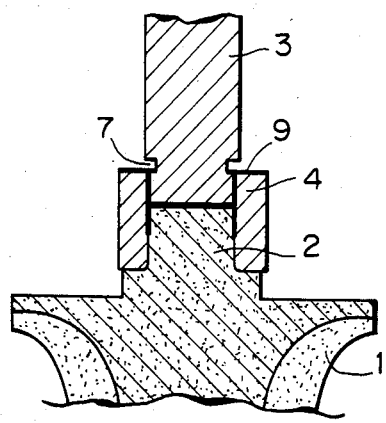

Referring to FIGS. 4 and 5, the metal-ceramic brazing process is specifically explained. To improve the wettability of the ceramic surface of the ceramic shaft 2 as compared to the metal surface of the impeller shaft 4, it is preferable to coat the ceramic surface with a suitable wetting agent such as titanium (Ti). Titanium may be coated on the ceramic surface in the form of deposit by vapor evaporation or paste or foil. Alternatively, such wetting agent as Ti may be coated on brazing filler metal. An agent for preventing penetration of brazing filler metal is coated on the outer surface of the ceramic shaft 2 and extends within an area from the shoulder 2b to the predetermined plane where the ring seal groove 5 lies.

Then, the turbine 1 is set with its ceramic shaft 2 pointing upwardly as seen in FIG. 4. A disc made of brazing filler metal 9 is placed on the axial end of the ceramic shaft 2. Ag-Cu alloy is used as the brazing filler metal. As mentioned above, wetting agent may be coated on the bottom surface of the brazing filler metal disc 9.

Subsequently, the cylindrical portion 4 of the metallic impeller shaft 3 is fit on the outer surface of the ceramic shaft 2 as shown in FIG. 4. After setting them in a jig as shown in FIG. 4, the assembly is heated in vacuum or deoxygen atmosphere where the brazing filler metal is melted. Since the axial length of the cylindrical portion 4 is slightly longer than the axial length of the ceramic shaft 2, the difference in length between them creates a clearance allowing the brazing filler metal 9 to be penetrated thereinto. The brazing filler metal 9 penetrates into clearance created between the closely fitted surfaces of the ceramic shaft 2 and cylindrical bore of the cylindrical portion 4. The penetration of the brazing filler metal 9 toward the one end of the cylinderical end of the bore beyond the predetermined plane is prevented by the brazing filler metal penetration preventive agent. The overabundance of the brazing filler metal 9 is discharged via the axial bores 8 and groove 7 as shown in FIG. 5.

After this brazing operation is completed, the ring seal groove 5 and oil grove 6 are formed, and the surface portions of the impeller shaft 3 where it is journalled by the bearings 11 and 12 are subject to quench hardening.

Figure 6:
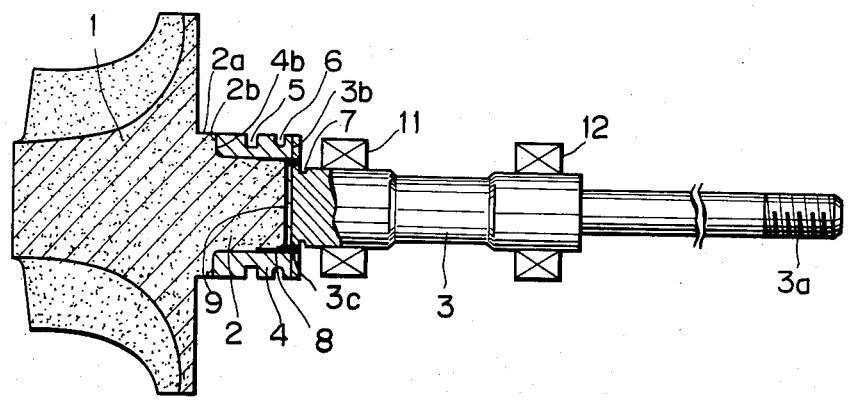
FIG. 6 is a sectional view similar to FIG. 1 showing a second embodiment.
Figure 7:
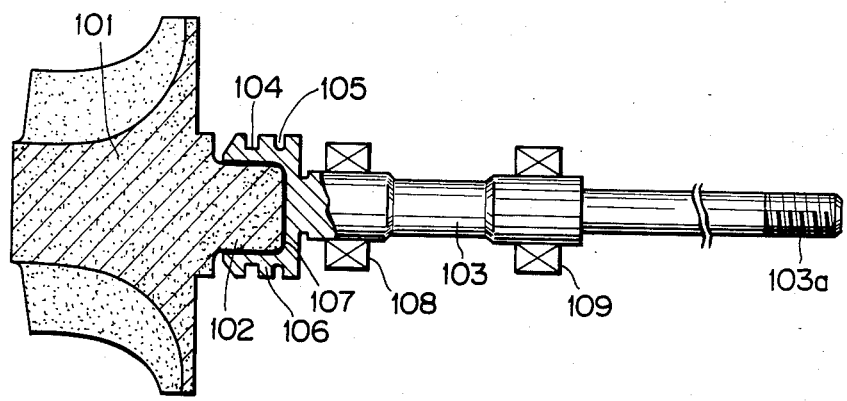
FIGS. 7 to 9 shows the previously discussed structures.
Figure 8:
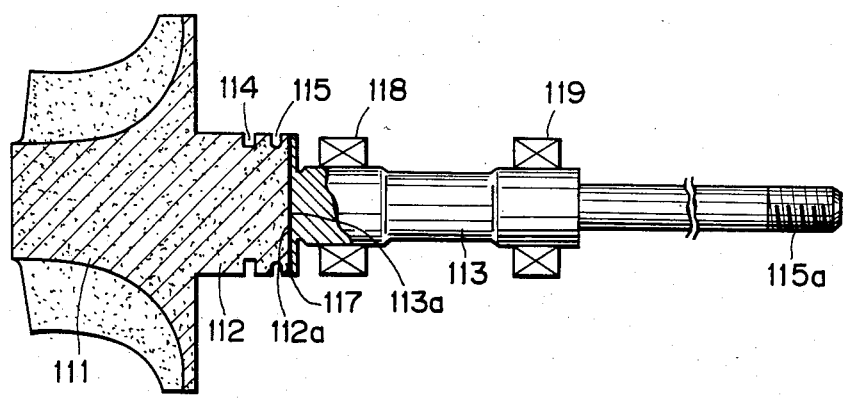
Figure 9:
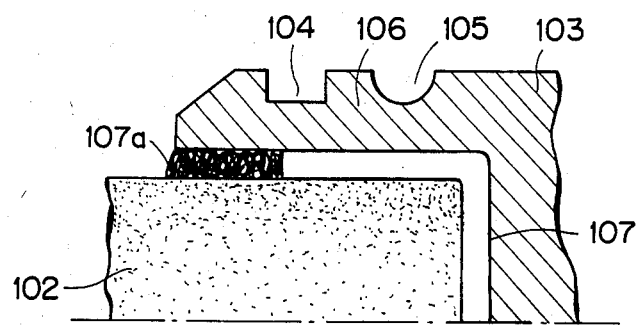

Referring to FIG. 6, the second embodiment is described. This embodiment is different from the previously described first embodiment in that a cylindrical bore defining portion 4 is a separate piece from an impeller shaft 3. The cylindrical bore defining portion 4 has a closed axial end joined to a flanged end 3b of an impeller shaft 3 by friction welding or beam welding. Similary to the counterpart of the previously described embodiment, axial grooves 8 are formed for the discharge of brazing filler metal 9. To mate with these axial grooves, holes are formed through the flanged end 3b of the impeller shaft 3.

The cylindrical portion 4 of this embodiment may be made of a material which is considered to compatible well with the ceramic. More specifically, the material with a small thermal expansion coefficient and with a small modulus of elasticity is suitable, such as, stainless steel, maraging steel, Kovar (registered trade mark of Westinghouse Electric Co. in U.S.A.), nickel (Ni), nickel alloy (Ni alloy), molybdenum (Mo), molybdenum alloy (Mo alloy). For impeller shaft 3, carbon steel or structural steel alloy is sutable as its material because it is inexpensive and its surface is easy to be quench hardened. Although the second embodiment requires welding process of different metals, the use of relatively cheap metal contribuites to cost reduction.

What is claimed is:
1. A joint structure, comprising:
a metallic shaft including a metallic cylindrical end portion having a cylindrical bore with an open end;
a ceramic shaft received in said cylindrical bore;
said metallic cylindrical portion formed with a ring seal groove;
a brazing filler metal distributed between closely fitted surfaces of said ceramic shaft and said cylindrical bore and extending axially toward said open end of said cylindrical bore up to a predetermined plane where said ring seal groove lies; and
means for closing said open end of said cylindrical bore.
2. A joint structure as claimed in claim 1, wherein said closing means includes an adhesive.
3. A joint structure as claimed in claim 1, wherein said cylindrical end portion is formed integral with said metallic shaft.
4. A joint structure as claimed in claim 1, wherein said cylindrical end portion is formed as a separate piece from said metallic shaft.

* * * * *